April 11, 1939.　　G. C. R. KUIPER　　2,154,171
VEHICLE BRAKE
Filed Sept. 21, 1936　　2 Sheets—Sheet 1

INVENTOR.
GERHARD C.R. KUIPER
BY
ATTORNEY.

April 11, 1939.　　　G. C. R. KUIPER　　　2,154,171
VEHICLE BRAKE
Filed Sept. 21, 1936　　　2 Sheets-Sheet 2

INVENTOR.
GERHARD C.R. KUIPER
BY
ATTORNEY.

Patented Apr. 11, 1939

2,154,171

REISSUED

UNITED STATES PATENT OFFICE 2,154,171

VEHICLE BRAKE

Gerhard C. R. Kuiper, Cleveland, Ohio, assignor to The Midland Steel Products Company, Cleveland, Ohio, a corporation of Ohio Application September 21, 1936, Serial No. 101,719

11 Claims. (Cl. 303—31)

This invention relates to new and useful improvements in vehicle brakes and an object of the invention is to provide a compensating relay valve for controlling the operation of the trailer brakes.

Another object of the invention is to provide a compensating valve having a plurality of pressure responsive means of different effective areas for actuating the valve.

A further object of the invention is to provide a compensating valve having a plurality of pressure responsive means defining an actuating chamber therebetween to operate the valve, to thereby eliminate the necessity of springs to operate the valve.

Other objects and advantages of the invention will become apparent during the course of the following description.

Figure 2:
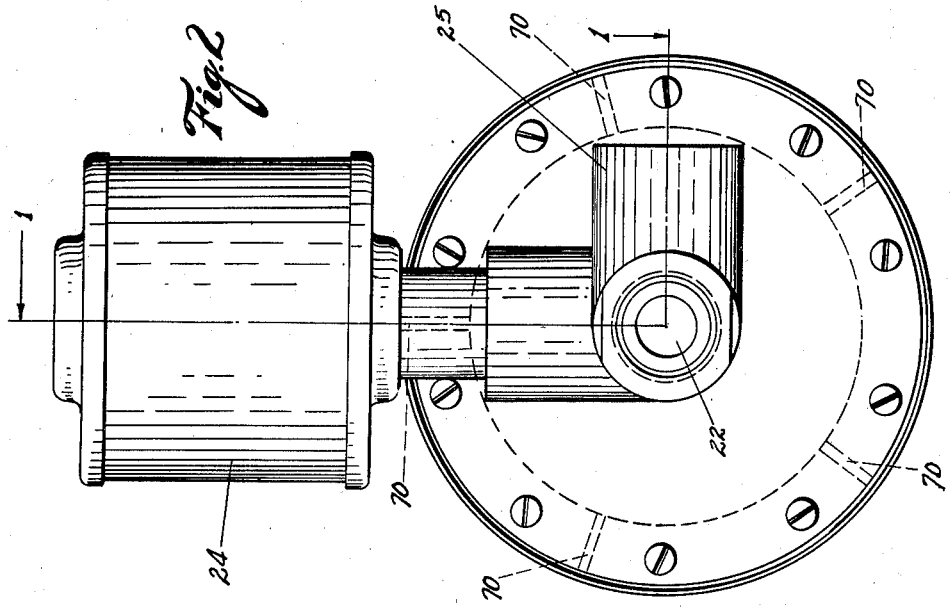
Figure 1:
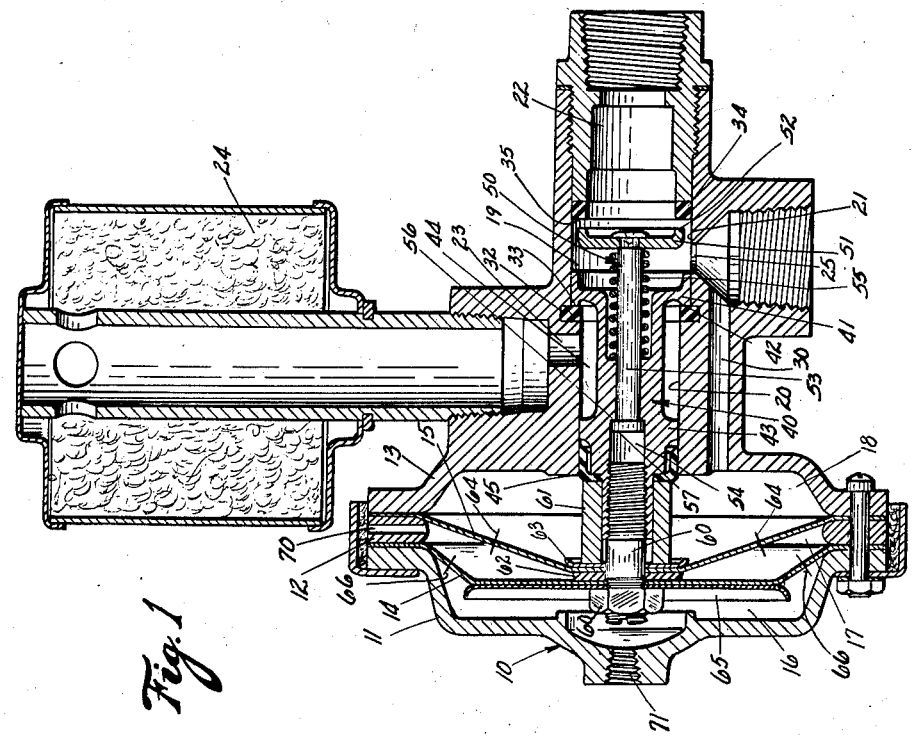
Figure 3:
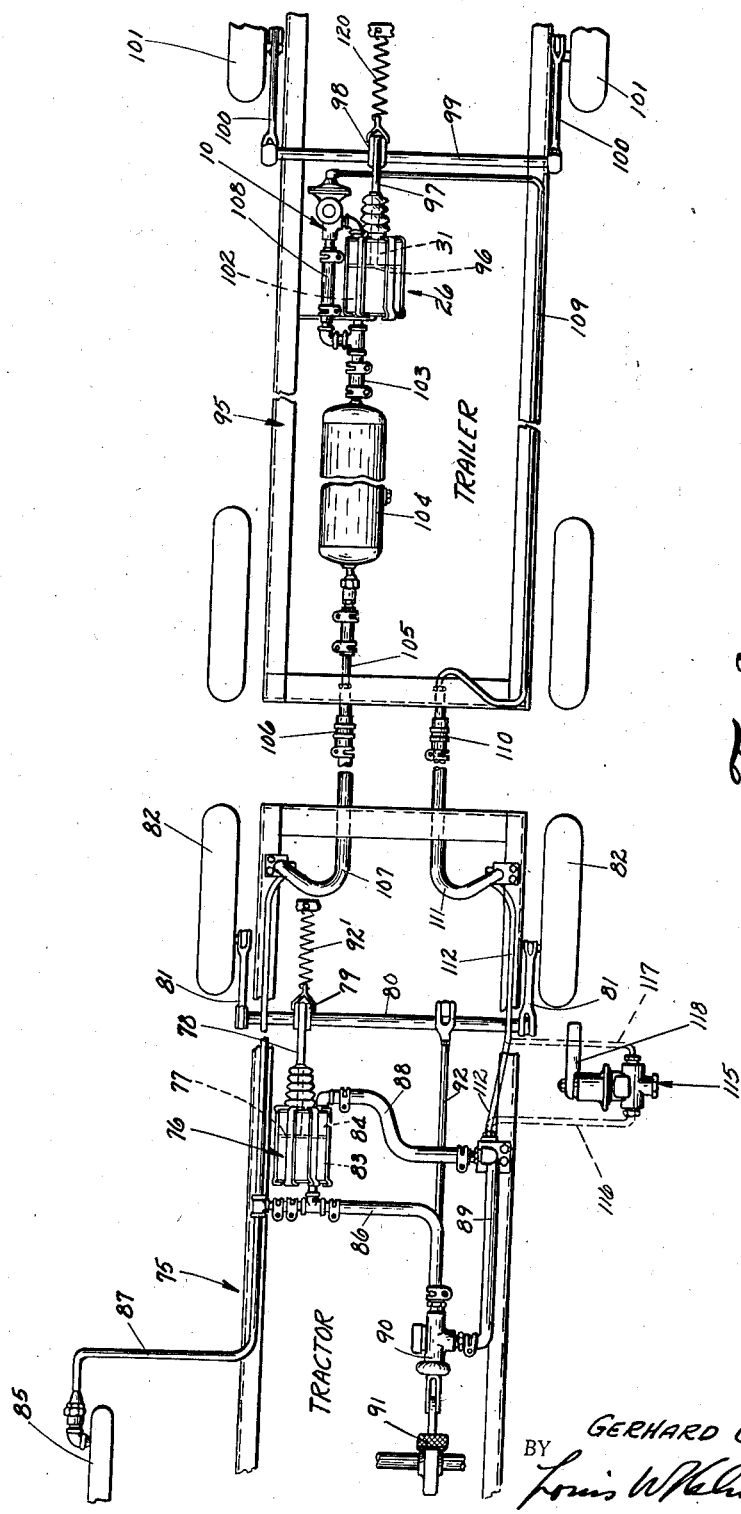

In the accompanying drawings forming a part of the description and wherein like numerals are employed to designate like parts throughout the several views:

Fig. 1 is a sectional view of the compensating valve taken on the line 1—1 of Fig. 2, Fig. 2 is an end elevational view of the compensating valve, and Fig. 3 is a tractor-trailer brake system embodying the compensating valve.

Referring more particularly to Figs. 1 and 2, the numeral 10 designates a compensating relay valve comprising a housing formed in three sections 11, 12, and 13 secured together near the marginal edges of two diaphragms 14 and 15 which divide the housing into three chambers 16, 17 and 18. Extending longitudinally of the housing section 13 is a bore 19 having a reduced portion 20 communicating with the chamber 18 at one end and with an enlarged portion 21 at its other end. A sleeve 22 connected to a source of suction, such as the intake manifold of an internal combustion engine is screwed into the enlarged portion 21 of the bore. This housing is also provided with a lateral port 23 communicating with the reduced portion of the bore 19 and with a breather 24 communicating with the atmosphere. Another lateral port 25 communicates with the enlarged portion of the bore 19 near its juncture with the portion 20 and with a chamber 31 of a power cylinder 26 to be later described. A by-pass 30 extends from the chamber 18 to the power cylinder port 25, to at all times, maintain the chamber 18 in communication with the power cylinder port 25 and subject one side of the diaphragm 15 to the same pressure as exists in chamber 31 of the power cylinder.

At the shoulder formed by the reduction in the diameter of the bore 19 is an annular recess in which is disposed a resilient seat member 32 having its inner peripheral surface in line with the surface of the reduced bore 20 and having a part of its flat side displaced to provide a resilient valve seat 33. Another annular resilient member 34 is disposed in the large bore 21 against the sleeve 22 and has one side exposed to provide a resilient valve seat 35.

Reciprocally mounted in the bore 19 is a spool type valve 40 for controlling communication of atmosphere between the port 23 and the power cylinder port 25 and is provided at its outer end with an enlarged annular closure or valve 41 which slidably engages the large bore 21 in substantially air tight fashion. This closure 41 has an annular valve portion 42 which engages the resilient valve seat 33. Adjacent the opposite end of the spool 40 is another annular closure 43 which slidably engages the reduced bore 20 in substantially air tight fashion. The annular closures 43 and 41 define therebetween an annular recess 44 which at all times spans the atmosphere port 23 irrespective of the position of the valve 40. Secured to the valve 40 is a cup-shaped packing 45 having its marginal annular flange in air tight engagement with the reduced bore 20.

Another valve device 50 is disposed in the enlarged bore 21 to control communication between the manifold port 22 and the power cylinder port 25. This valve device comprises a disk 51 having an annular flange smaller than the bore 21 to provide a valve 52 engageable with the resilient valve seat 35 and has a valve stem 53 slidably mounted in a bore 54 in the spool valve 40. A spring 55 interposed between the valve 51 and the valve 40 permits relative movement between these valves. Movement of the auxiliary valve 51 away from the spool valve 40 is limited by an enlarged head 57 at the end of the valve stem 53 abutting against a shoulder 56 formed by a reduction in the diameter of the bore 54.

The pressure responsive means for operating the valves 40 and 51 comprise the diaphragms 14 and 15 which are secured to the inner end of the valve 40 by means of a stud 60 threaded into the bore 54. The diaphragm 15 is spaced away from the packing 45 by a spacer 61 which serves in clamping the packing 45 in the spool valve, and the diaphragms 14 and 15 are spaced from each other by a washer 62. It will be noted that a clamping plate 63 of relatively small diameter is disposed on one side of the diaphragm 15. The effective diameter of the latter will therefore be approximately the distance between the lines 64 on the diaphragm 15. A clamping plate 65 of relatively large diameter is arranged on one side of diaphragm 14, making its effective diameter approximately the distance between the lines 66 on the diaphragm 14. Since the effective diameter of diaphragm 15 is less than the effective diameter of diaphragm 14, the latter will predominate over the diaphragm 15 and will tend to move the valves 40 and 51 in the direction where the differential pressure on the diaphragm 14 is greatest. The pressure in the chamber 17 between the diaphragms 14 and 15 is at all times at atmospheric pressure because the sectional housing 12 is provided with a plurality of ports 70 spaced circumferentially and exposed to the atmosphere through an air cleaner disposed in spaced relation about the periphery of the housing sections 11, 12 and 13 and retaining filtering material over the ports.

The sectional housing 11 is provided with a port 71 which communicates in a suitable manner with an operator operated control valve to subject the diaphragm 14 exposed in the chamber 16 to the differential pressures admitted to the latter by manipulating the control valve.

This relay valve is employed in the tractor-trailer brake system illustrated in Fig. 3 herein shown as comprising a tractor 75 provided with a vacuum suspended brake system having a vacuum suspended power cylinder 76 closed at both ends and is provided with a piston 77 having a piston rod 78 connected to an arm 79 fixed to a rock shaft 80 having at its opposite ends, a brake arm 81 connected to wheel brake mechanism not shown for the tractor wheels 82. The piston 77 defines chambers 83 and 84 in opposite ends of the power cylinder 76; the chamber 83 communicating with the intake manifold 85 through conduits 86 and 87 for its source of suction. The other chamber 84 is connected to the source of suction through conduits 88 and 89, control valve 90 of the type for example, shown on my co-pending application Serial No. 78,870 filed May 9, 1936, and then through the conduits 86 and 87 to the manifold 85. The control valve 90 is operated by a foot pedal 91 having a lost motion connection with a link 92 in a manner described in the aforesaid application, and is connected to the rock shaft 80. A retractor spring 92' is connected to the arm 79 of cross shaft 80 to urge the brake system to brake release position.

This tractor brake system is connected to a trailer 95 having a vacuum suspended brake system comprising the power cylinder 26 closed at both ends and is provided with a piston 96 having a piston rod 97 connected to an arm 98 fixed to a rock shaft 99 having at its opposite ends a brake arm 100 connected to the wheel brake mechanism, not shown, of the trailer wheels 101. The piston 96 defines chambers 31 and 102 at opposite ends of the power cylinder 26; the chamber 31 communicating with the power cylinder port 25 of the compensating relay valve 10. The chamber 102 communicates with the source of suction through a conduit 103, reservoir 104, conduit 105, coupling 106 and conduits 107 and 87 to the manifold 85. The chambers 31 and 102 communicate with each other exteriorly of the power cylinder 26 by means of a conduit 108 connected to the conduit 103 and to the sleeve 22 of the compensating relay valve 10. The diaphragm chamber 16 of the relay valve is connected to the control valve 90 through a conduit 109, coupling 110 and conduits 111, 112 and 89 to the valve 90 and thence to the source of suction through the conduits 86 and 87 to the manifold 85.

In operation assume that the brakes are in release position, in this position the control valve 90 is open to provide communication between the conduits 86 and 89, whereby the piston 77 will be suspended in vacuum since the chambers 83 and 84 will then be in communication with the manifold 85. The relay valve is in the position shown in Fig. 1 to uncover the valve seat 35 whereby the chamber 31 in the power cylinder 26 is in communication with the source of suction through the port 25 in the relay valve, enlarged bore 21, sleeve 22, conduit 108 and through conduit 103 to the manifold 85, and since the power cylinder chamber 31 is connected to the manifold 85 the diaphragm chamber 18 in the relay valve will also be exposed to suction through the by-pass 30 and power cylinder port 25, while the chamber 102 of the power cylinder 26 is at all times connected to the manifold 85 through the conduit 103, reservoir 104, conduit 105, coupling 106 and conduits 107 and 87. The diaphragm chamber 16 is exposed to vacuum through the conduit 109, coupling 110, conduits 112 and 89, control valve 90 and conduits 86 and 87 to the manifold 85. The valves 40 and 51 are maintained in brake release position when the diaphragm chambers 16 and 18 are exposed to suction since the air in the chamber 17 exerts atmospheric pressure against the diaphragms 14 and 15, but since the diaphragm 14 has the greatest effective area it predominates over diaphragm 15 to move the valve 40 and 51 to the position shown in Fig. 1 and maintains the valves in this position without the use of springs.

In order to apply the brakes, pressure is exerted on the foot pedal 91 to operate the control valve 90 and interrupt communication between the conduits 89 and 86 to the manifold and permits atmosphere to enter the conduits 89 and 88 to the power chamber 84. The piston 77 is now unbalanced and the atmosphere in the power cylinder chamber 84 moves the piston 77 to the left as seen in Fig. 3 to operate the rock shaft 80 and thus apply the brakes of the tractor wheels 82.

Atmosphere also enters from the control valve 90 through the conduits 89, 112 and 111, coupling 110 and conduit 109 to the diaphragm chamber 16 in the relay valve. The diaphragm chamber 18 is still exposed to suction and accordingly the atmosphere now present in diaphragm chamber 16 causes the diaphragms 14 and 15 to move to the right as viewed in Fig. 1. This movement brings the valve 52 into sealing engagement with the resilient valve seat 35 to close off the diaphragm chamber 18 and power cylinder chamber 31 to the source of suction. Continued movement of the diaphragms then causes the spring 55 to be compressed whereby the atmosphere valve 40 moves toward the seated valve 52 and the annular valve 41 uncovers the port 25 to bring the power cylinder chamber 31 into communication with the atmosphere through the air cleaner 24, port 23, annular recess 44 and port 25 to the power cylinder chamber 31. The diaphragm chamber 18 is at the same time exposed to atmosphere through the by-pass 30 communicating with the port 25. In this brake applied position the suction in the conduit 108 tends to hold the valve 52 on its seat 35.

Should the operator reduce the pressure exerted on the foot pedal 91 so that the valve 90 is slightly open to the source of vacuum at the manifold 85, the pressure in the diaphragm chamber 16 will be reduced and the atmosphere present in the diaphragm chamber 17 will exert pressure on the diaphragm 14 and cause the latter to predominate over the diaphragm 15 to move the valve 40 only sufficiently toward its valve seat 42 to close the port 25 whereby the valves 40 and 52 remain in lap position and the brakes will remain in applied position.

In order to release the brakes, pressure is completely removed from the pedal 91, the latter is moved to release position by a suitable retractor spring and the control valve 90 re-establishes communication between the conduits 86 and 89 with the manifold 85 whereby the chamber 84 of the power cylinder 76 is exposed to suction and the retractor spring 92' moves the tractor brakes to release position. The diaphragm chamber 16 in the relay valve is also exposed to suction and accordingly the diaphragm 14 is subjected to differential pressure of vacuum and atmosphere to move the valves 42 and 52 into brake release position shown in Fig. 1 whereby the diaphragm chamber 18 and power cylinder chamber 31 are again exposed to the source of suction and the retractor spring 120 moves the piston 96 and the trailer wheel brakes to release position.

If desired, the trailer brakes may be actuated by a separate hand operated control valve 115 of the type shown in my aforesaid co-pending application. This valve is connected by conduits 116 and 117, shown in dotted lines, to the conduit 112. In operation the control lever 118 is manipulated independently of the foot control valve 90 to control the admission of atmosphere to the diaphragm chamber 16 in the relay valve to operate the valves 40 and 50 as will be understood.

Should the trailer accidentally separate from the tractor, air will be admitted into the trailer conduit 109 and thence into the diaphragm chamber 16 with consequent automatic brake application of the valves 40 and 50 and the trailer brakes in the manner hereinbefore described. A check valve not shown is provided in the conduit 105 to prevent entrance of air into the reservoir 104 when the trailer breaks away from the tractor. The trailer brakes are maintained in brake applied position for a considerable length of time after this accidental separation because the valve 52 is seated on the resilient valve seat 35 to prevent entrance of atmosphere from the breather 24 and bore 19 to the manifold port 22 and thus through the conduits 108 and 103 to the reservoir 104 and power cylinder chamber 102 to thereby maintain the high degree of vacuum necessary to hold the trailer brakes in applied position.

It will be understood that various changes in the construction and arrangement of parts may be resorted to without departing from the scope of the appended claims.

I claim:

1. In a power brake system having a source of suction, a power cylinder to operate the brakes, a relay valve having a valve housing provided with a bore and ports communicating with said source of suction, power cylinder and the atmosphere, valve mechanism in said bore for controlling flow of the high and low pressure fluids to said power cylinder, a pair of spaced members responsive to differential pressure of vacuum and atmosphere to operate said valve mechanism, said spaced members defining a chamber between its adjacent sides at all times communicating with the atmosphere and defining variable pressure chambers between their opposite sides and said housing, means for at all times communicating one of said variable pressure chambers to said power cylinder, and a control valve for exposing the other of said variable pressure chambers to said source of suction and to the atmosphere.

2. In a power brake system having a source of suction, a power cylinder to operate the brakes, a relay valve having a valve housing provided with a bore and ports communicating with said source of suction, power cylinder and the atmosphere, valve mechanism in said bore for controlling flow of the high and low pressure fluids to said power cylinder, a pair of spaced members of different effective areas responsive to differential pressure of vacuum and atmosphere to operate said valve mechanism, said spaced members defining a chamber between its adjacent sides at all times communicating with the atmosphere and defining variable pressure chambers between their opposite sides and said housing, means for at all times communicating one of said variable pressure chambers to said power cylinder, and a control valve for exposing the other of said variable pressure chambers to said source of suction and to the atmosphere.

3. A valve for a power braking system, comprising a housing provided with a bore and ports for connection with the source of high pressure, brake cylinder and source of low pressure, valve mechanism in said bore including a first valve means for controlling communication between said brake cylinder port and high pressure port, and a second valve means directly controlled by the first valve means and movable with respect to said first valve means for controlling communication between said brake cylinder port and low pressure port, resilient means between said valve means for permitting said relative movement therebetween, and pressure responsive means connected to said valve mechanism and adapted to be exposed to high and low pressures to effect movement thereof and of said valve mechanism.

4. A valve for a power braking system, comprising a housing provided with a bore and ports for connection with the source of high pressure, brake cylinder, and source of low pressure, valve mechanism in said bore for controlling flow of fluid between said brake port, high pressure port and low pressure port, and a pair of spaced members responsive to differential pressures to operate said valve mechanism, said spaced members defining a constant pressure chamber between them and defining variable pressure chambers between their opposite sides and said housing, one of which is at all times connected to said brake port.

5. In a power brake system having a source of suction, a power cylinder to operate the brakes, a relay valve having a valve housing provided with a bore and ports communicating with said source of suction, power cylinder and the atmosphere, valve mechanism in said bore for controlling flow of high and low pressure fluids to said power cylinder, an enlarged pressure differential chamber, a pair of spaced members therein having different effective area and being responsive to differential pressure of vacuum and atmosphere to operate said valve mechanism, a chamber within said differential chamber and arranged between said members to communicate at all times with the atmosphere, and said pair of spaced members defining variable pressure chambers between themselves and said housing, means for at all times communicating one of said variable pressure chambers to said power cylinder, and a control valve for exposing the other of said variable pressure chambers to said source of suction and to the atmosphere.

6. In a power brake system having a source of suction, a power cylinder to operate the brakes, a relay valve having a valve housing provided with a bore and ports communicating with said source of suction, power cylinder and the atmosphere, valve mechanism in said bore for controlling flow of the high and low pressure fluids to said power cylinder, an enlarged pressure differential chamber, a pair of spaced members therein having different effective areas and being responsive to differential pressure of vacuum and atmosphere to operate said valve mechanism, a chamber within said differential chamber and arranged between said members to communicate at all times with the atmosphere, the larger area member having one side exposed to constant pressure and the other side to variable pressures, the smaller area member having one side exposed to constant pressure and the other side to variable pressures, said pair of members defining variable pressure chambers between themselves and said housing, means for at all times communicating one of said variable pressure chambers to said power cylinder and a control valve for exposing the other of said variable pressure chambers to said source of suction and to the atmosphere.

7. In a power brake system having a source of suction, a power cylinder to operate the brakes, a relay valve having a valve housing provided with a bore and ports communicating with said source of suction, power cylinder and the atmosphere, a valve mechanism in said bore having a valve body for controlling the flow of high pressure fluid to said power cylinder, an auxiliary valve mounted in the valve body with a spring interposed between the two whereby movement of the valve body directly influences the auxiliary valve for controlling the flow of low pressure fluid to said cylinder, and pressure responsive means connected to said valve mechanism and adapted to be exposed to high and low pressures to effect movement thereof and of said valve mechanism.

8. In a power brake system having a source of suction, a power cylinder to operate the brakes, a relay valve having a valve housing provided with a bore and ports communicating with said source of suction, power cylinder and the atmosphere, a valve mechanism in said bore having a valve body for controlling the flow of high pressure fluid to said power cylinder, an auxiliary valve mounted in the valve body with a spring interposed between the two for controlling the flow of low pressure fluid to said cylinder, said valve housing having a pressure differential chamber, a pair of spaced members therein having different effective area and being responsive to differential pressure of vacuum and atmosphere to operate said valve mechanism, a chamber within said differential chamber arranged between said members to communicate at all times with the atmosphere, said spaced members defining variable pressure chambers between their opposite sides and said housing, and means for at all times communicating one of said variable pressure chambers to said brake port.

9. A valve for a power braking system comprising a housing provided with a bore and ports connecting with sources of high and low pressure and with a brake cylinder, a valve in said bore for controlling the flow through said ports, a pair of spaced members responsive to differential pressures to operate said valve, said spaced members defining a constant pressure chamber between their adjacent sides and defining variable pressure chambers between their opposite sides and said housing, one of said variable pressure chambers being exposed to a source of variable pressures, and pressure to the other of said variable pressure chambers being controlled by said valve and being at all times connected to said brake cylinder port.

10. A valve for power braking systems comprising a valve housing provided with a bore and parts connecting with sources of high and low pressure and with a brake cylinder, a variable pressure chamber formed at one end of said housing, said bore terminating at the other end of the housing in an enlarged valve chamber having resilient seats at opposite ends thereof, said valve chamber communicating with the brake cylinder port and said variable pressure chamber, a diaphragm in said variable pressure chamber, and a valve mechanism connected with said diaphragm and slidable in said bore for cooperation with the yieldable seats.

11. A valve for power braking systems comprising a housing provided with a bore and ports communicating with sources of high and low pressure and with a brake cylinder, a variable pressure chamber associated with said valve housing, a pressure responsive diaphragm mounted in said chamber, a valve mounted in said bore for controlling a pair of said ports, an auxiliary valve slidably mounted in the first valve for controlling the third port, and spring means interposed between the two valves.

GERHARD C. R. KUIPER.